(12) United States Patent
Harwani et al.

(10) Patent No.: US 12,008,401 B2
(45) Date of Patent: Jun. 11, 2024

(54) AUTOMATIC CENTRAL PROCESSING UNIT (CPU) USAGE OPTIMIZATION

(71) Applicant: ADVANCED MICRO DEVICES, INC., Santa Clara, CA (US)

(72) Inventors: Anil Harwani, Austin, TX (US); Amitabh Mehra, Fort Collins, CO (US); William R. Alverson, Austin, TX (US); Grant E. Ley, Austin, TX (US); Jerry A. Ahrens, Austin, TX (US); Kenneth Mitchell, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/723,427

(22) Filed: Dec. 20, 2019

(65) Prior Publication Data

US 2021/0191778 A1 Jun. 24, 2021

(51) Int. Cl.
*G06F 9/48* (2006.01)
*G06F 3/06* (2006.01)
*G06F 9/50* (2006.01)
*G06F 9/54* (2006.01)
*G06F 11/30* (2006.01)
*G06F 11/34* (2006.01)

(52) U.S. Cl.
CPC ............ *G06F 9/5005* (2013.01); *G06F 3/065* (2013.01); *G06F 3/0656* (2013.01); *G06F 9/48* (2013.01); *G06F 9/50* (2013.01); *G06F 9/5027* (2013.01); *G06F 9/54* (2013.01); *G06F 9/544* (2013.01); *G06F 11/3024* (2013.01); *G06F 11/3433* (2013.01)

(58) Field of Classification Search
CPC ........ G06F 9/48; G06F 9/4806; G06F 9/4843; G06F 9/485; G06F 9/4856; G06F 9/4881; G06F 9/4893; G06F 9/50; G06F 9/5005; G06F 9/5011; G06F 9/5016; G06F 9/5027; G06F 9/5033; G06F 9/5044; G06F 9/505; G06F 9/5083; G06F 9/5088; G06F 11/30; G06F 11/3024; G06F 11/3058; G06F 11/34; G06F 11/3409; G06F 11/3433
See application file for complete search history.

(56) References Cited

U.S. PATENT DOCUMENTS

| | | | | |
|---|---|---|---|---|
| 2005/0138442 A1* | 6/2005 | Keller | ................... | G06F 1/3268 713/300 |
| 2009/0138882 A1* | 5/2009 | Anand | .................. | G06F 9/5027 718/104 |
| 2009/0222654 A1* | 9/2009 | Hum | ...................... | G06F 1/3296 713/100 |

(Continued)

FOREIGN PATENT DOCUMENTS

WO 2017020798 A1 2/2017

OTHER PUBLICATIONS

International Search Report and Written Opinion, PCT/US2020/065905, dated May 11, 2021, 15 pages.

(Continued)

*Primary Examiner* — Charles M Swift

(57) ABSTRACT

Automatic central processing unit (CPU) usage optimization includes: monitoring performance activity of a workload comprising a plurality of threads; and modifying a resource allocation of a plurality of cores for the plurality of threads based on the performance activity.

20 Claims, 6 Drawing Sheets

(56) References Cited

U.S. PATENT DOCUMENTS

| | | | |
|---|---|---|---|
| 2012/0066535 A1* | 3/2012 | Naffziger | G06F 1/3203 |
| | | | 713/340 |
| 2012/0291040 A1* | 11/2012 | Breternitz | G06F 9/5083 |
| | | | 718/104 |
| 2012/0297395 A1* | 11/2012 | Marchand | G06F 9/5027 |
| | | | 718/104 |
| 2014/0129808 A1* | 5/2014 | Naveh | G06F 9/4856 |
| | | | 712/225 |
| 2015/0186184 A1* | 7/2015 | Kim | G06F 9/5088 |
| | | | 718/104 |
| 2016/0092363 A1* | 3/2016 | Wang | G06F 1/3206 |
| | | | 711/119 |
| 2017/0097854 A1* | 4/2017 | Shah | G06F 9/5033 |
| 2017/0269966 A1 | 9/2017 | Kim et al. | |
| 2019/0034239 A1* | 1/2019 | Cai | G06F 12/0811 |
| 2020/0019841 A1* | 1/2020 | Shaabana | G06N 3/0445 |
| 2020/0192689 A1* | 6/2020 | Smith, IV | G06F 16/178 |

OTHER PUBLICATIONS

Nita et al., "Efficient Threads Mapping on Multicore Architecture", 8th International Conference on Communications (COMM), Jun. 2010, pp. 53-56, Institute of Electrical and Electronics Engineers (IEEE), Piscataway, NJ, USA, DOI: 10.1109/ICCOMM.2010.5508993.

* cited by examiner

AUTOMATIC CENTRAL PROCESSING UNIT (CPU) USAGE OPTIMIZATION

BACKGROUND

Current fused preferred core algorithms are based off of the maximum frequency during a worst case workload, however this ranking may not be the same for a lightly threaded application or non-worst case customer workload.

DETAILED DESCRIPTION

Figure 1:
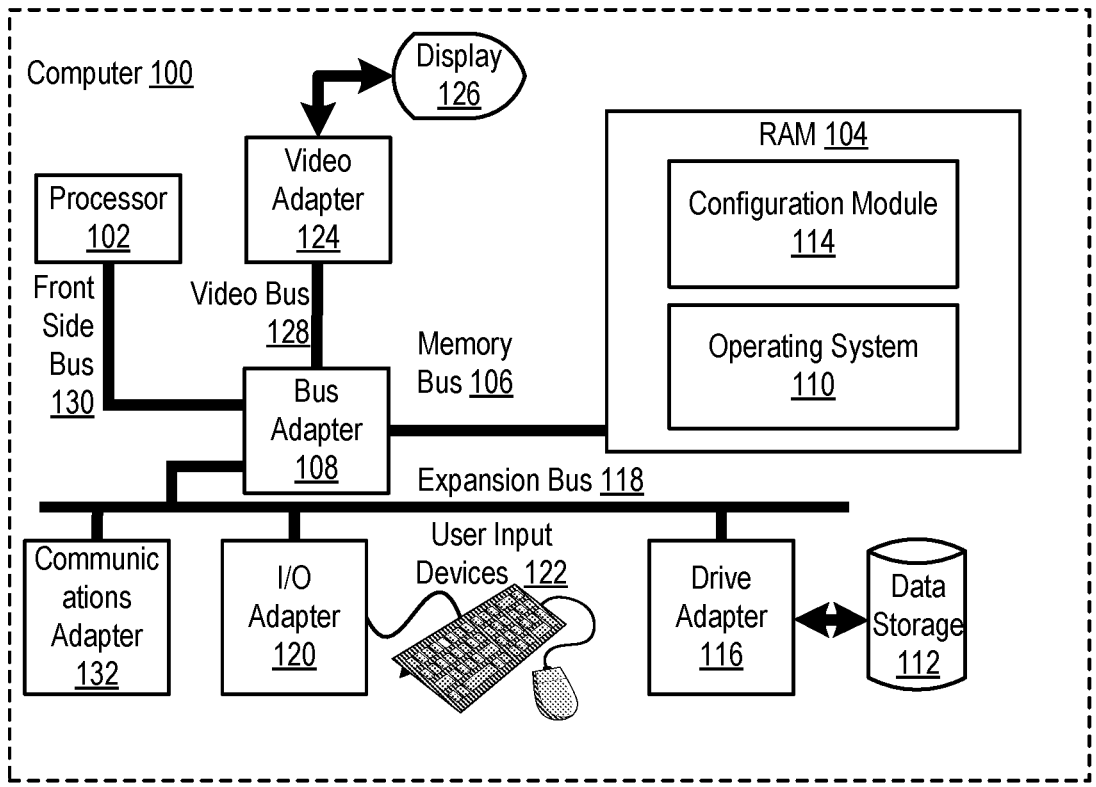
FIG. 1 is a block diagram of an example computer for automatic central processing unit (CPU) usage optimization according to some embodiments.

In some embodiments, a method of automatic central processing unit (CPU) usage optimization includes: monitoring performance activity of a workload including a plurality of threads; and modifying a resource allocation of a plurality of cores for the plurality of threads based on the performance activity.

In some embodiments, the method further includes: identifying, based on the performance activity, a first thread of the plurality of threads and a second thread of the plurality of threads related to the first thread; and wherein modifying the resource allocation includes modifying a core assignment to reduce a physical distance between a first core of the plurality of cores assigned the first thread and a second core of the plurality of cores assigned the second thread. In some embodiments, the first core and the second core are located within a same compute core complex (CCX), a same core complex die (CCD), a same socket, a same non-uniform memory access (NUMA) domain, and/or a same compute node. In some embodiments, the method further includes: identifying, based on a degree of cache misses indicated in the performance activity, a first thread of the plurality of threads and a second thread of the plurality of threads assigned to a same core of the plurality of cores; and wherein modifying the resource allocation includes assigning one or more of the first thread and the second thread to different cores of the plurality of cores. In some embodiments, the method further includes: monitoring, after modifying the resource allocation, additional performance activity; and determining, based on the additional performance activity, whether to undo a modification to the resource allocation. In some embodiments, the method further includes: storing data indicating the resource allocation in association with the workload; and loading, based on an execution of the workload, the data indicating the resource allocation. In some embodiments, modifying the resource allocation includes modifying one or more thresholds for one or more cores of the plurality of cores, wherein the one or more thresholds include a package power tracking (PPT) threshold, a thermal design current (TDC) threshold, an electrical design current (EDC) threshold, or a Reliability Limit including a threshold amount of time a core can safely spend at a voltage/temperature pair.

In some embodiments, an apparatus for automatic central processing unit (CPU) usage optimization performs steps including: monitoring performance activity of a workload comprising a plurality of threads; and modifying a resource allocation of a plurality of cores for the plurality of threads based on the performance activity.

In some embodiments, the steps further include: identifying, based on the performance activity, a first thread of the plurality of threads and a second thread of the plurality of threads related to the first thread; and wherein modifying the resource allocation includes modifying a core assignment to reduce a physical distance between a first core of the plurality of cores assigned the first thread and a second core of the plurality of cores assigned the second thread. In some embodiments, the first core and the second core are located within a same compute core complex (CCX), a same core complex die (CCD), a same socket, a same non-uniform memory access (NUMA) domain, and/or a same compute node. In some embodiments, the steps further include: identifying, based on a degree of cache misses indicated in the performance activity, a first thread of the plurality of threads and a second thread of the plurality of threads assigned to a same core of the plurality of cores; and wherein modifying the resource allocation includes assigning one or more of the first thread and the second thread to different cores of the plurality of cores. In some embodiments, the steps further include: monitoring, after modifying the resource allocation, additional performance activity; and determining, based on the additional performance activity, whether to undo a modification to the resource allocation. In some embodiments, the steps further include: storing data indicating the resource allocation in association with the workload; and loading, based on an execution of the workload, the data indicating the resource allocation. In some embodiments, modifying the resource allocation includes modifying one or more thresholds for one or more cores of the plurality of cores, wherein the one or more thresholds include a package power tracking (PPT) threshold, a thermal design current (TDC) threshold, an electrical design current (EDC) threshold, or a Reliability Limit including a threshold amount of time a core can safely spend at a voltage/temperature pair.

In some embodiments, a computer program product for automatic central processing unit (CPU) usage optimization disposed upon a computer readable medium includes computer program instructions that, when executed, cause a computer to perform steps including: monitoring performance activity of a workload comprising a plurality of threads; and modifying a resource allocation of a plurality of cores for the plurality of threads based on the performance activity.

In some embodiments, the steps further include: identifying, based on the performance activity, a first thread of the plurality of threads and a second thread of the plurality of threads related to the first thread; and wherein modifying the resource allocation includes modifying a core assignment to reduce a physical distance between a first core of the plurality of cores assigned the first thread and a second core of the plurality of cores assigned the second thread. In some embodiments, the first core and the second core are located within a same compute core complex (CCX), a same core complex die (CCD), a same socket, a same non-uniform memory access (NUMA) domain, and/or a same compute node. In some embodiments, the steps further include: identifying, based on a degree of cache misses indicated in the performance activity, a first thread of the plurality of threads and a second thread of the plurality of threads assigned to a same core of the plurality of cores; and wherein modifying the resource allocation includes assigning one or more of the first thread and the second thread to different cores of the plurality of cores. In some embodiments, the steps further include: monitoring, after modifying the resource allocation, additional performance activity; and determining, based on the additional performance activity, whether to undo a modification to the resource allocation. In some embodiments, the steps further include: storing data indicating the resource allocation in association with the workload; and loading, based on an execution of the workload, the data indicating the resource allocation.

Automatic central processing unit (CPU) usage optimization in accordance with the present disclosure is generally implemented with computers, that is, with automated computing machinery. For further explanation, therefore, FIG. 1 sets forth a block diagram of automated computing machinery including an exemplary computer 100 configured for automatic central processing unit (CPU) usage optimization according to certain embodiments. The computer 100 of FIG. 1 includes at least one computer processor 102 or 'CPU' as well as random access memory 104 (RAM') which is connected through a high speed memory bus 106 and bus adapter 108 to processor 102 and to other components of the computer 100.

Stored in RAM 104 is an operating system 110. Operating systems useful in computers configured for automatic central processing unit (CPU) usage optimization include UNIX™ Linux™, Microsoft Windows™, and others as will occur to those of skill in the art. The operating system 108 in the example of FIG. 1 is shown in RAM 104, but many components of such software typically are stored in non-volatile memory also, such as, for example, on data storage 112, such as a disk drive. Also stored in RAM is the configuration module 114 a module for automatic central processing unit (CPU) usage optimization according to embodiments of the present invention.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for automatic central processing unit (CPU) usage optimization include Integrated Drive Electronics ('IDE') adapters, Small Computer System Interface ('SCSI') adapters, and others as will occur to those of skill in the art. In some embodiments, non-volatile computer memory is be implemented for as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output (I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for automatic central processing unit (CPU) usage optimization include modems for wired dial-up communications, Ethernet (IEEE 802.3) adapters for wired data communications, and 802.11 adapters for wireless data communications.

Figure 2:
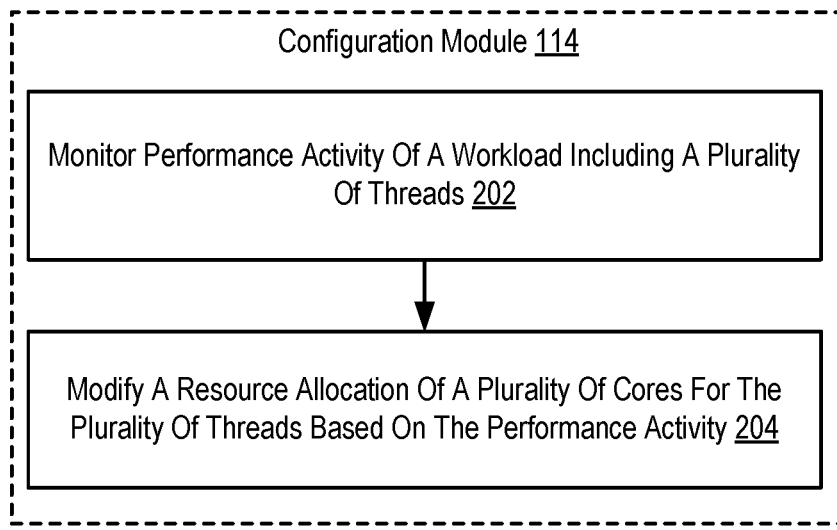
FIG. 2 is a flowchart of an example method for automatic central processing unit (CPU) usage optimization according to some embodiments.

For further explanation, FIG. 2 sets forth a flow chart illustrating an exemplary method for automatic central processing unit (CPU) optimization that includes monitoring 202 (e.g., by a configuration module 114) performance activity of a workload including a plurality of threads. A workload includes an executed software application, process, service, or combinations thereof. Execution of the workload is facilitated by the plurality of threads. Each thread is assigned to a particular core of a plurality of cores (e.g., of the central processing unit (CPU)), with each core being able to support one or more threads of the plurality of threads.

Monitoring 202 the performance activity of the workload includes identifying behaviors or metrics associated with the execution of the workload. Examples of performance activity include, for a given thread, amounts of traffic across a data fabric, latency, activity time (e.g., time that the thread is active versus inactive), number of functions or operations performed (e.g., per second), amounts and types of memory or cache accesses, amounts or frequency of cache hits or misses, etc. In some embodiments, monitoring 202 the performance activity includes monitoring the performance activity across a particular time window (e.g., sampling). In other embodiments, monitoring 202 the performance activity includes continually monitoring the performance activity and updating data indicating the performance activity over time.

The method of FIG. 2 also includes modifying 204 a resource allocation of a plurality of cores for the plurality of threads. In some embodiments, modifying 204 a resource allocation includes modifying one or more thresholds for one or more of the cores. Examples of thresholds that are modified include, for a particular core, a package power tracking (PPT) threshold (e.g., the threshold of the allowed socket power consumption permitted across the voltage rails supplying the socket), a thermal design current (TDC) threshold (e.g., a maximum amount of current in amps that can be delivered by a specific motherboard's voltage regulator configuration in thermally-constrained scenarios), an electrical design current (EDC) threshold (e.g., a maximum amount of current in amps that can be delivered by a specific motherboard's voltage regulator configuration a peak ("spike") condition for a short period of time), or a Reliability Limit (e.g., the maximum threshold of the amount of time a core spends at voltage/temperature pair that is deemed safe for the silicon in a chip). As an example, where a first thread is identified to be highly active relative to a second thread, one or more thresholds of a first core assigned the first thread are increased and one or more thresholds of a second core assigned the second thread are decreased. Thus, the first core assigned the first thread receives more current compared to the second core assigned the second thread.

In some embodiments, modifying 204 the resource allocation includes modifying a core assignment for one or more threads. As each thread is assigned to a particular core, one or more threads are reassigned to different cores. In some embodiments, modifying a core assignment includes modifying the core assignment to reduce a physical distance between cores to which particular threads are assigned. For example, parent and child threads, hero and helper threads, or other highly related threads rely on extensive inter-thread communication across a data fabric. By reassigning one or more of the related threads to more proximate cores, latency in inter-thread communications is reduced.

As another example, assume a first and second thread executing on the same core. The performance activity indicates that both the first and second thread are highly active in accessing the cache of this same core, and that both the first and second thread cause a high number of cache misses (e.g., due to one thread writing to the cache due to a cache miss, causing the other thread to then have a cache miss). The first and/or second thread is then reassigned such that the first and second thread are each assigned to different cores with different caches. By separating cache hungry threads onto different cores, the overall number of cache misses is reduced and performance is increased.

In existing solutions, multiple threads for a given workload are typically allocated equal resources. Furthermore, existing preferred core algorithms are typically based on maximum frequencies at worst case scenarios. For lightly threaded applications or workloads that do not approach worst case scenarios, these default resource allocations do not result in optimal performance for the workload. By monitoring 202 the performance activity of the workload and modifying 204 resource allocations dynamically, the workload benefits from an optimal resource assignment.

Figure 3:
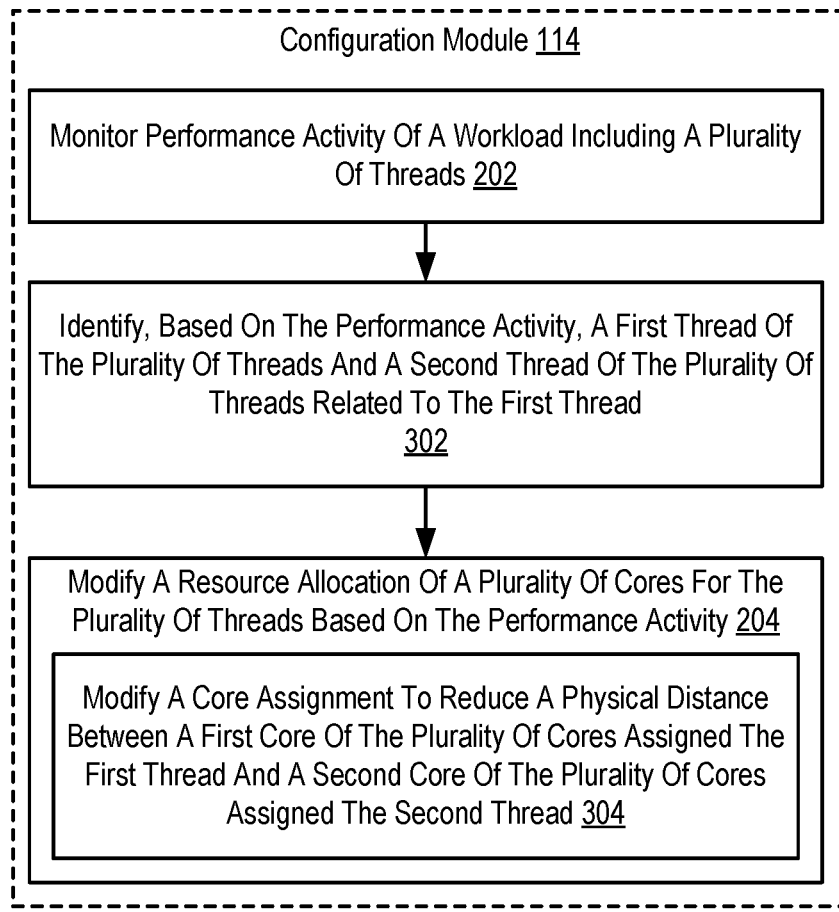
FIG. 3 is a flowchart of an example method for automatic central processing unit (CPU) usage optimization according to some embodiments.

For further explanation, FIG. 3 sets forth a flow chart illustrating an exemplary method for automatic central processing unit (CPU) optimization that includes monitoring 202 (e.g., by a configuration module 114) performance activity of a workload including a plurality of threads; and modifying 204 a resource allocation of a plurality of cores for the plurality of threads based on the performance activity.

The method of FIG. 3 differs from FIG. 2 in that the method of FIG. 3 also includes identifying 302 (e.g., by the configuration module 114), based on the performance activity, a first thread of the plurality of threads and a second thread of the plurality of threads related to the first thread. In some embodiments, identifying 302 the first thread and the second thread includes identifying the second thread as called or accessed by the first thread. For example, the second thread is identified as being executed in response to a context switch from the first thread (e.g., a number or frequency of context switches exceeding a threshold). As another example, the second thread is identified as being executed in response to a call from the first thread (e.g., a number or frequency of calls exceeding a threshold). As a further example, the second thread is identified as communicating with the first thread via a data fabric (e.g., for a duration exceeding a threshold or passing an amount of data exceeding a threshold). In other words, the second thread is identified as having a degree of intercommunication or interrelationship with the first thread.

The method of FIG. 3 further differs from FIG. 2 in that modifying 204 a resource allocation of a plurality of cores for the plurality of threads based on the performance activity includes modifying 304 a core assignment to reduce a physical distance between a first core of the plurality of cores assigned the first thread and a second core of the plurality of cores assigned the second thread. The first thread and/or the second thread are assigned to new cores to reduce the distance of a data pathway between the cores executing the first thread and the second thread. For example, the first thread and/or the second thread are reassigned such that the first core and the second core are located within a same compute core complex (CCX), a same core complex die (CCD), a same socket, a same non-uniform memory access (NUMA) domain, and/or a same compute node.

Figure 4:
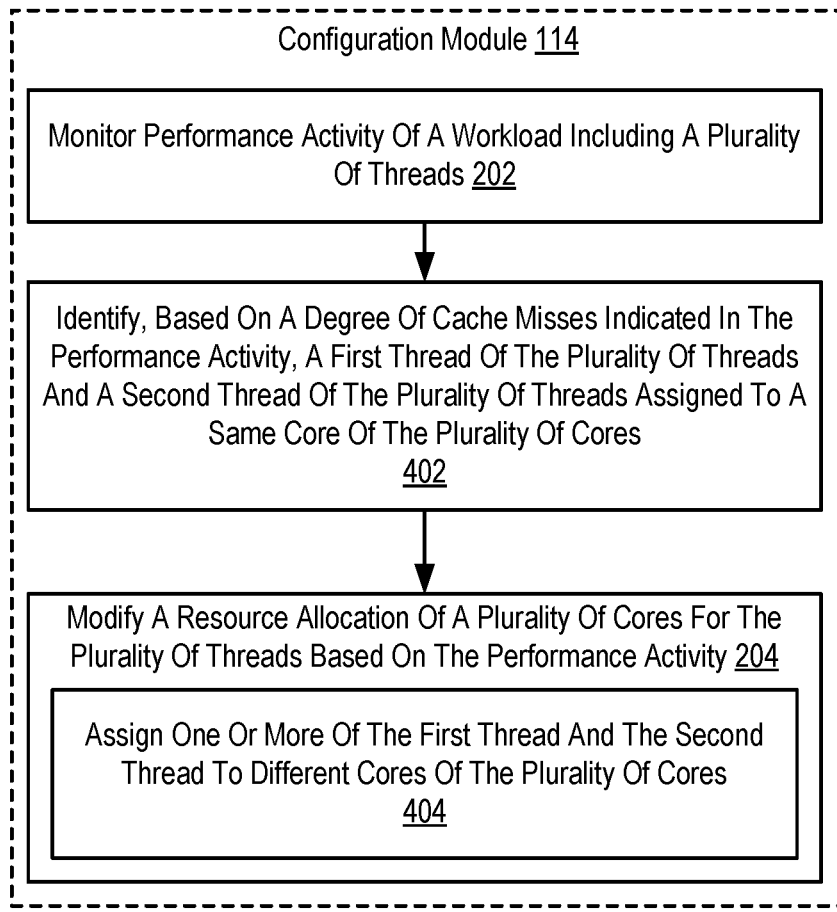
FIG. 4 is a flowchart of an example method for automatic central processing unit (CPU) usage optimization according to some embodiments.

For further explanation, FIG. 4 sets forth a flow chart illustrating an exemplary method for automatic central processing unit (CPU) optimization that includes monitoring 202 (e.g., by a configuration module 114) performance activity of a workload including a plurality of threads; and modifying 204 a resource allocation of a plurality of cores for the plurality of threads based on the performance activity.

The method of FIG. 4 differs from FIG. 2 in that the method of FIG. 4 also includes identifying 402 (e.g., by the configuration module 114), based on a degree of cache misses indicated in the performance activity, a first thread of the plurality of threads and a second thread of the plurality of threads assigned to a same core of the plurality of cores. In other words, both the first thread and the second thread access a same cache of the same core. The first thread and the second thread are identified based on a degree of cache misses (e.g., within a time window) for both threads exceeding a threshold. Thus, each thread of the first thread and the second thread is experiencing cache misses, forcing each thread to write new data into the shared cache and promoting cache misses for the other thread.

The method of FIG. 4 further differs from FIG. 2 in that modifying 204 a resource allocation of a plurality of cores for the plurality of threads based on the performance activity includes assigning 404 one or more of the first thread and the second thread to different cores of the plurality of cores. In other words, instead of being assigned to the same core, the first thread and the second thread are assigned to different cores. For example, either the first thread or the second thread are reassigned to a different core. As another example, both the first thread and the second thread are assigned to new, different cores. Thus, the first thread and the second thread no longer share a same cache and the degree of cache misses is reduced, thereby increasing performance of both threads.

Figure 5:
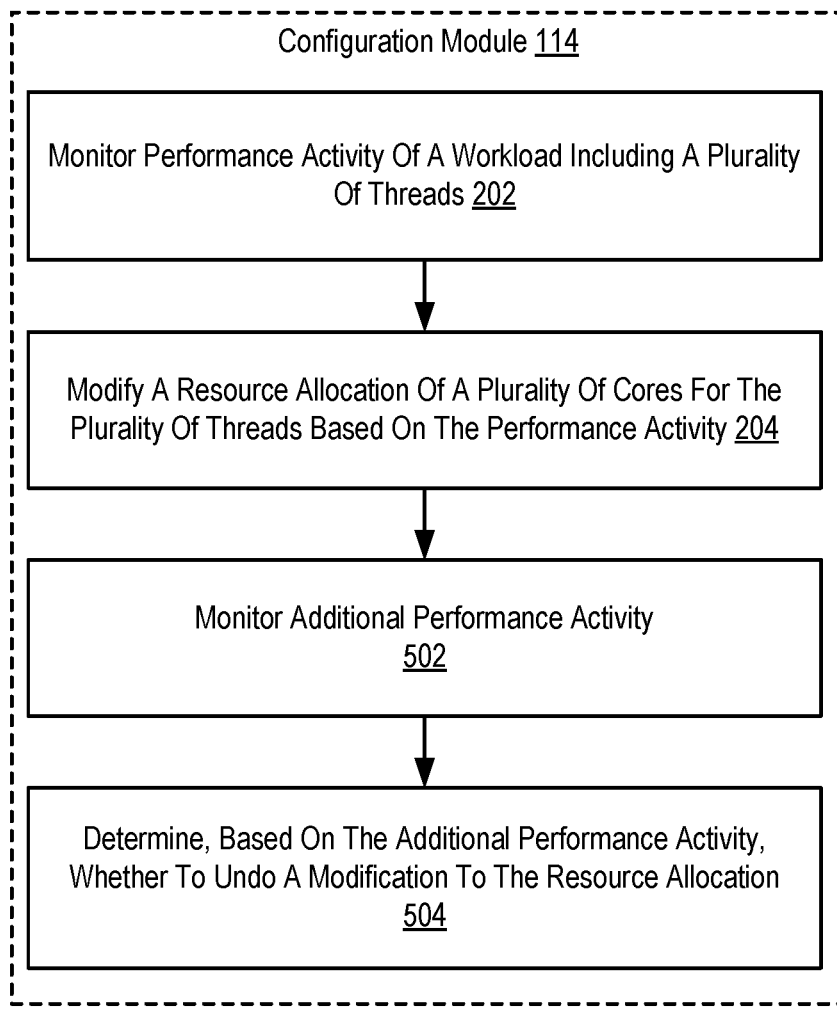
FIG. 5 is a flowchart of an example method for automatic central processing unit (CPU) usage optimization according to some embodiments.

For further explanation, FIG. 5 sets forth a flow chart illustrating an exemplary method for automatic central processing unit (CPU) optimization that includes monitoring 202 (e.g., by a configuration module 114) performance activity of a workload including a plurality of threads; and modifying 204 a resource allocation of a plurality of cores for the plurality of threads based on the performance activity.

The method of FIG. 5 differs from FIG. 2 in that the method of FIG. 5 also includes monitoring 502 (e.g., by the configuration module 114) additional performance activity.

In other words, performance activity for the workload is monitored 502 after modifying 204 the resource allocation. Thus, the additional performance activity reflects performance of the workload after modifying 204 the resource allocation.

The method of FIG. 5 further differs from FIG. 2 in that the method of FIG. 5 also includes determining 504, based on the additional performance activity whether to undo a modification to the resource allocation. For example, the performance activity monitored 202 before modifying 204 the resource allocation is compared to the additional performance activity monitored 502 after modifying 204 the resource allocation to determine if performance has improved. Where the additional performance activity indicates that performance has decreased, remained the same, or increased to a degree below a threshold, it is determined that the modification to the resource allocation is undone. Where the additional performance activity indicates that performance has increased or increased to a degree above a threshold, it is determined not to undo the modification.

One skilled in the art would appreciate that, in some embodiments, the method of FIG. 5 is performed repeatedly such that multiple modifications are made to resource allocations. If a given modification results in a performance improvement, the modification is maintained. Additional modifications are then performed and determinations made as to whether to keep or undo the modification.

Figure 6:
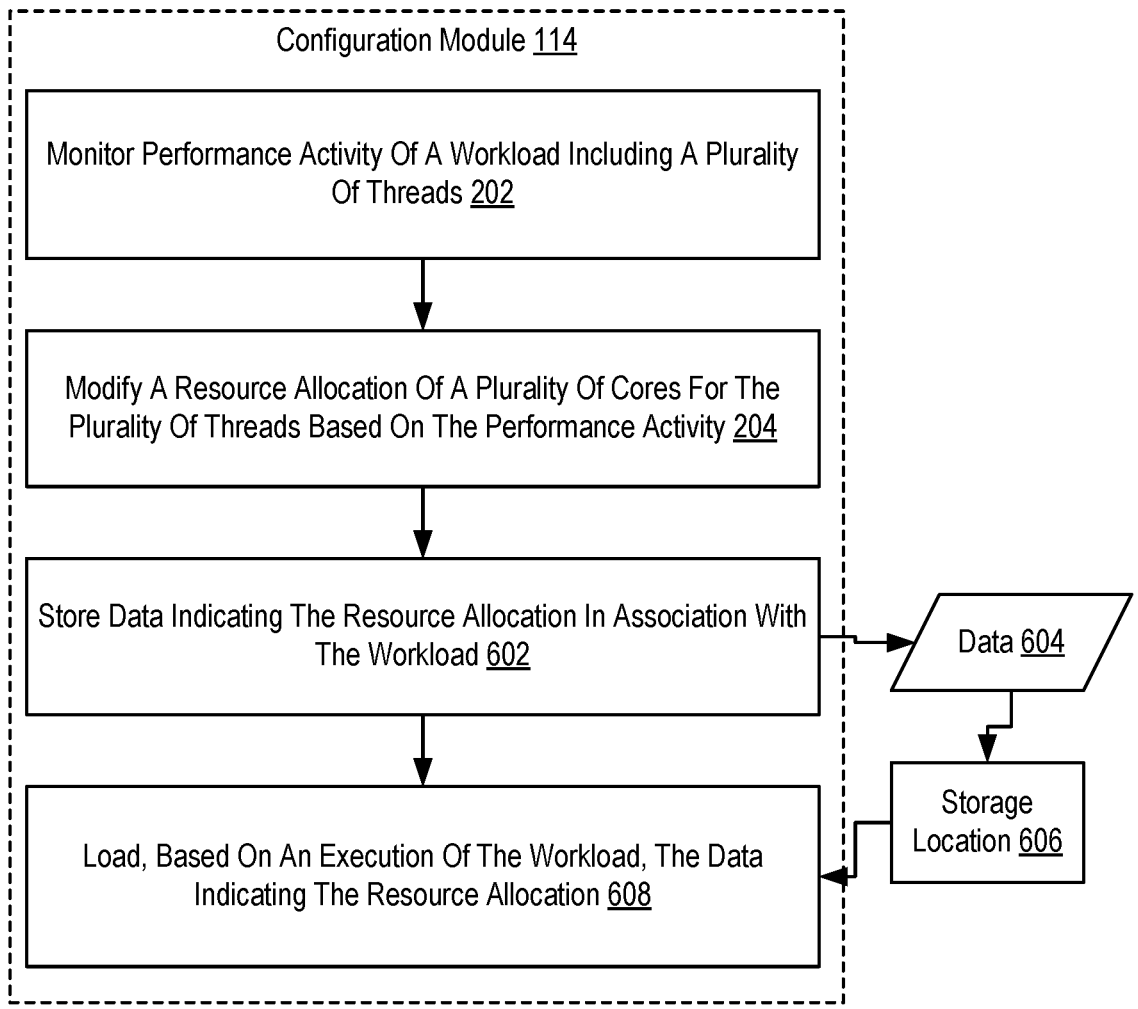
FIG. 6 is a flowchart of an example method for automatic central processing unit (CPU) usage optimization according to some embodiments.

For further explanation, FIG. 6 sets forth a flow chart illustrating an exemplary method for automatic central processing unit (CPU) optimization includes monitoring 202 (e.g., by a configuration module 114) performance activity of a workload including a plurality of threads; and modifying 204 a resource allocation of a plurality of cores for the plurality of threads based on the performance activity.

The method of FIG. 6 differs from FIG. 2 in that the method of FIG. 6 also includes storing 602 (e.g., by the configuration module 114) data 604 indicating the resource allocation in association with the workload. The data 604 is stored in a storage location 606. In some embodiments, the storage location 606 is local storage (e.g., local non-volatile memory such as disk storage). In other embodiments, the storage location 606 is remote storage (e.g., a cloud storage system or server). The data 604 indicates the resource allocation in association with the workload by identifying, in the data 604 the particular workload for which the resource allocation was optimized. For example, the data 604 indicates process names or identifiers, application names, or other identifiers associated with the workload.

The method of FIG. 6 differs from FIG. 2 in that the method of FIG. 6 also includes loading 608, based on an execution of the workload, the data 604 indicating the resource allocation. For example, in some embodiments, the data 604 is loaded 608 in response to a request or command to execute the workload. In other embodiments, the configuration module 114 or another module monitors executed applications and services to determine that the workload is being executed. In some embodiments, after loading 608 the data 604, the resource allocation indicated in the data 604 is applied such that resources are optimally allocated for the particular workload.

In view of the explanations set forth above, readers will recognize that the benefits of automatic central processing unit (CPU) usage optimization according to embodiments of the present disclosure include:
  Improved performance of a computing system by optimizing resource allocations for particular workloads.

Exemplary embodiments of the present disclosure are described largely in the context of a fully functional computer system for automatic central processing unit (CPU) usage optimization. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of automatic central processing unit (CPU) usage optimization, the CPU including a plurality of cores, the method comprising:
    modifying a resource allocation of the plurality of cores for a plurality of threads based on performance activity of a workload comprising the plurality of threads; and
    storing data, associated with the workload, indicating the modified resource allocation of the plurality of cores of the CPU, wherein the data indicating the modified resource allocation of the plurality of cores of the CPU is loaded upon a request for execution of the workload and the modified resource allocation is applied to the plurality of cores after the data is loaded.

2. The method of claim 1, further comprising:
    identifying, based on the performance activity, a first thread of the plurality of threads and a second thread of the plurality of threads related to the first thread;
    wherein modifying the resource allocation comprises modifying a core assignment to reduce a physical distance between a first core of the plurality of cores assigned the first thread and a second core of the plurality of cores assigned the second thread.

3. The method of claim 2, wherein the first core and the second core are located within a same compute core complex (CCX), a same core complex die (CCD), a same socket, a same non-uniform memory access (NUMA) domain, and/or a same compute node.

4. The method of claim 1, further comprising:
    identifying, based on a degree of cache misses indicated in the performance activity, a first thread of the plurality of threads and a second thread of the plurality of threads assigned to a same core of the plurality of cores;
    wherein modifying the resource allocation comprises assigning one or more of the first thread and the second thread to different cores of the plurality of cores.

5. The method of claim 1, further comprising:
    monitoring, after modifying the resource allocation, additional performance activity; and
    determining, based on the additional performance activity, whether to undo a modification to the resource allocation.

6. The method of claim 1, wherein modifying the resource allocation comprises modifying, for one or more cores of the plurality of cores, one or more thresholds based on the thread each respective core of the one or more cores is executing, wherein the one or more thresholds comprise a package power tracking (PPT) threshold, a thermal design current (TDC) threshold, an electrical design current (EDC) threshold, or a Reliability Limit comprising a threshold amount of time a core can safely spend at a voltage/temperature pair.

7. The method of claim 1, wherein the data is stored in remote memory.

8. An apparatus for automatic central processing unit (CPU) usage optimization, the apparatus comprising:
a CPU including a plurality of cores; and
memory operatively coupled to the CPU, stored within memory computer program instructions executed to:
modify a resource allocation of the plurality of cores for a plurality of threads based on performance activity of a workload comprising the plurality of threads; and
store data, associated with the workload, indicating the modified resource allocation of the plurality of cores of the CPU, wherein the data indicating the modified resource allocation of the plurality of cores of the CPU is loaded upon a request for execution of the workload and the modified resource allocation is applied to the plurality of cores after the data is loaded.

9. The apparatus of claim 8, further comprising computer program instructions executed to:
identify, based on the performance activity, a first thread of the plurality of threads and a second thread of the plurality of threads related to the first thread;
wherein modifying the resource allocation comprises modifying a core assignment to reduce a physical distance between a first core of the plurality of cores assigned the first thread and a second core of the plurality of cores assigned the second thread.

10. The apparatus of claim 9, wherein the first core and the second core are located within a same compute core complex (CCX), a same core complex die (CCD), a same socket, a same non-uniform memory access (NUMA) domain, and/or a same compute node.

11. The apparatus of claim 8, further comprising computer program instructions executed to:
identify, based on a degree of cache misses indicated in the performance activity, a first thread of the plurality of threads and a second thread of the plurality of threads assigned to a same core of the plurality of cores;
wherein modifying the resource allocation comprises assigning one or more of the first thread and the second thread to different cores of the plurality of cores.

12. The apparatus of claim 8, further comprising computer program instructions executed to:
monitor, after modifying the resource allocation, additional performance activity; and
determine, based on the additional performance activity, whether to undo a modification to the resource allocation.

13. The apparatus of claim 8, wherein the resource allocation is modified by modifying, for one or more cores of the plurality of cores, one or more thresholds based on the thread each respective core of the one or more cores is executing, wherein the one or more thresholds comprise a package power tracking (PPT) threshold, a thermal design current (TDC) threshold, an electrical design current (EDC) threshold, or a Reliability Limit comprising a threshold amount of time a core can safely spend at a voltage/temperature pair.

14. The apparatus of claim 8, wherein the data is stored in remote memory.

15. A computer program product for automatic central processing unit (CPU) usage optimization, the CPU including a plurality of cores, the computer program product disposed upon a non-transitory computer readable medium, the computer program product comprising computer program instructions that, when executed, cause a computer to:
modify a resource allocation of the plurality of cores for a plurality of threads based on performance activity of a workload comprising the plurality of threads; and
store data, associated with the workload, indicating the modified resource allocation of the plurality of cores of the CPU, wherein the data indicating the modified resource allocation of the plurality of cores of the CPU is loaded upon a request for execution of the workload and the modified resource allocation is applied to the plurality of cores after the data is loaded.

16. The computer program product of claim 15, further comprising computer program instruction that, when executed, cause the computer to:
identify, based on the performance activity, a first thread of the plurality of threads and a second thread of the plurality of threads related to the first thread;
wherein the resource allocation is modified by modifying a core assignment to reduce a physical distance between a first core of the plurality of cores assigned the first thread and a second core of the plurality of cores assigned the second thread.

17. The computer program product of claim 16, wherein the first core and the second core are located within a same compute core complex (CCX), a same core complex die (CCD), a same socket, a same non-uniform memory access (NUMA) domain, and/or a same compute node.

18. The computer program product of claim 15, further comprising computer program instructions that, when executed, cause the computer to:
identify, based on a degree of cache misses indicated in the performance activity, a first thread of the plurality of threads and a second thread of the plurality of threads assigned to a same core of the plurality of cores;
wherein the resource allocation is modified by assigning one or more of the first thread and the second thread to different cores of the plurality of cores.

19. The computer program product of claim 15, further comprising computer program instructions that, when executed, cause the computer to:
monitor, after modifying the resource allocation, additional performance activity; and
determine, based on the additional performance activity, whether to undo a modification to the resource allocation.

20. The computer program product of claim 15, wherein the data is stored in remote memory.

* * * * *